United States Patent [19]

Kraus

[11] Patent Number: 4,846,008
[45] Date of Patent: Jul. 11, 1989

[54] TRACTION ROLLER TRANSMISSION

[75] Inventor: Charles E. Kraus, Austin, Tex.

[73] Assignee: Excelermatic Inc., Austin, Tex.

[21] Appl. No.: 188,132

[22] Filed: Apr. 25, 1988

Related U.S. Application Data

[63] Continuation of Ser. No. 946,896, Dec. 29, 1986, abandoned.

[51] Int. Cl.⁴ ............................................. F16H 13/06
[52] U.S. Cl. ...................................... 74/798; 74/206; 74/209
[58] Field of Search .................. 74/798, 202, 206, 209

[56] References Cited

U.S. PATENT DOCUMENTS

| | | | |
|---|---|---|---|
| 2,306,475 | 12/1942 | Wahl | 74/798 |
| 2,578,801 | 12/1951 | Harshberger | 74/798 |
| 3,283,614 | 11/1966 | Hewko | 74/798 |
| 3,375,739 | 4/1968 | Nasuytis | 74/798 |
| 3,478,623 | 11/1969 | Noguchi | 74/798 |
| 3,490,311 | 1/1970 | Okabe | 74/798 |
| 3,988,950 | 11/1976 | Mori | 74/798 |
| 4,052,915 | 10/1977 | Kraus | 74/798 |
| 4,060,010 | 11/1977 | Heden | 74/798 |
| 4,215,595 | 8/1980 | Kraus | 74/798 |
| 4,408,503 | 10/1983 | Kraus | 74/798 |
| 4,422,351 | 12/1983 | Kraus | 74/798 |
| 4,435,998 | 3/1984 | Kinoshita | 74/798 |
| 4,471,667 | 9/1984 | Kraus | 74/798 |
| 4,648,288 | 3/1987 | Kato et al. | 74/798 |

FOREIGN PATENT DOCUMENTS

| | | | |
|---|---|---|---|
| 16391 | 2/1934 | Australia | 74/798 |
| 112041 | 9/1928 | Austria | 74/798 |
| 23325 | 11/1921 | France | 74/798 |
| 1072329 | 9/1954 | France | 74/798 |
| 494348 | 3/1954 | Italy | 74/798 |
| 13761 | 5/1970 | Japan | 74/798 |
| 0039763 | 3/1979 | Japan | 74/798 |
| 0001852 | 1/1982 | Japan | 74/798 |
| 112015 | 1/1919 | United Kingdom | 74/798 |
| 446526 | 4/1936 | United Kingdom | 74/798 |

OTHER PUBLICATIONS

"Bearings and Rolling Traction, Analysis and Design", Excelermatic, Inc., FIGS. 20-3, 20-4 & 20-5, Charles E. Kraus.

Primary Examiner—Dwight G. Diehl
Assistant Examiner—Christopher C. Campbell

[57] ABSTRACT

In a planetary type traction roller transmission which comprises a sun, a traction ring and planetary traction rollers disposed in the space between, and in engagement with, the traction ring and the central sun, the traction surfaces of the sun, the traction rollers and the ring members are all somewhat conical and the members are so arranged that their axes and all tangential axial lines of the traction surfaces intersect in a single point on the axis of the transmission and a device is provided for urging the sun member toward that point of intersection and between the planetary rollers for forcing the planetary rollers into engagement with the sun and the traction ring.

7 Claims, 4 Drawing Sheets ically, that is, the 4,846,008

TRACTION ROLLER TRANSMISSION

This application is a continuation, of application Ser. No. 06/946,896, filed 12/29/86 now abandoned.

BACKGROUND OF THE INVENTION

The invention relates to a fixed ratio planetary type traction roller transmissions whose traction surfaces are in engagement with each other for the transmission of motion therebetween.

There are generally provided axial cam structures which generate axial forces dependent on the torque transmitted through the transmission and the axial forces so generated are applied to conical race rings or conical sun structures to provide the appropriate traction surface contact forces.

An arrangement in which the traction ring consists of two slightly conical rings which are forced toward each other to engage the traction rollers therebetween is shown for example in U.S. Pat. No. 4,052,915. But what is considered to be the closest art reference is applicant's published manuscript "Bearings and Rolling Traction, Analysis and Design" which is available from Excelermatic, Inc., Austin, Tex. 78731, describes, and shows in FIG. 20-3, a fixed ratio traction roller transmission mission in which the sun consists of two slightly conical sun sections which are forced toward each other to engage the traction rollers for firm torque-dependent engagement of the traction rollers with the traction ring and the sun structure.

In all these arrangements however there occurs some spin at the traction surfaces since the roller and ring traction surfaces are not quite cylindrical so that, with large contact forces, there will be some wear of the traction surfaces.

It is also noted that, with a small cone angle of the sun roller structure, there is necessarily a relatively large axial movement necessary for the conical sun portions which, in the given arrangement for example, requires cams at both sides of the sun roller structure. Larger axial camming motion can be obtained by cam structures associated with the larger-diameter traction rings as shown in U.S. Pat. No. 4,052,915, but high-speed orbiting of the traction rollers in these transmissions, especially in split-torque or regenerating planetary drives, will generate large centrifugal forces on the ring structure which may eventually overcome the cam forces on the ring structure to an extent that engagement of the planetary traction rollers with the sun roller becomes insufficient resulting in slippage between the sun roller and the planetary rollers.

It is the object of the present invention to overcome the disadvantages of the prior art arrangements.

SUMMARY OF THE INVENTION

In a planetary type traction roller transmission which comprises a sun, a traction ring and planetary traction rollers disposed in the space between, and in engagement with, the traction ring and the central sun, the traction surfaces of the sun, the traction rollers and the ring members are all somewhat conical and the members are so arranged that their axes and all tangential axial lines of the traction surfaces intersect in a single point on the axis of the transmission and means are provided for urging the sun member toward that point of intersection and between the planetary rollers for forcing the planetary rollers into engagement with the sun and the traction ring.

Preferably, the planetary rollers have a slight curvature, superimposed on their conical traction surfaces as it has been found that this greatly reduces surface stress peaks and prevents slippage under low-load operating conditions.

The means for urging the sun member between the planetary rollers is preferably an axial ball-cam structure formed by concentric shaft sections with the ball-receiving cam structure formed at the interface between the concentric shaft sections.

DESCRIPTION OF SOME EMBODIMENTS

Figure 1:
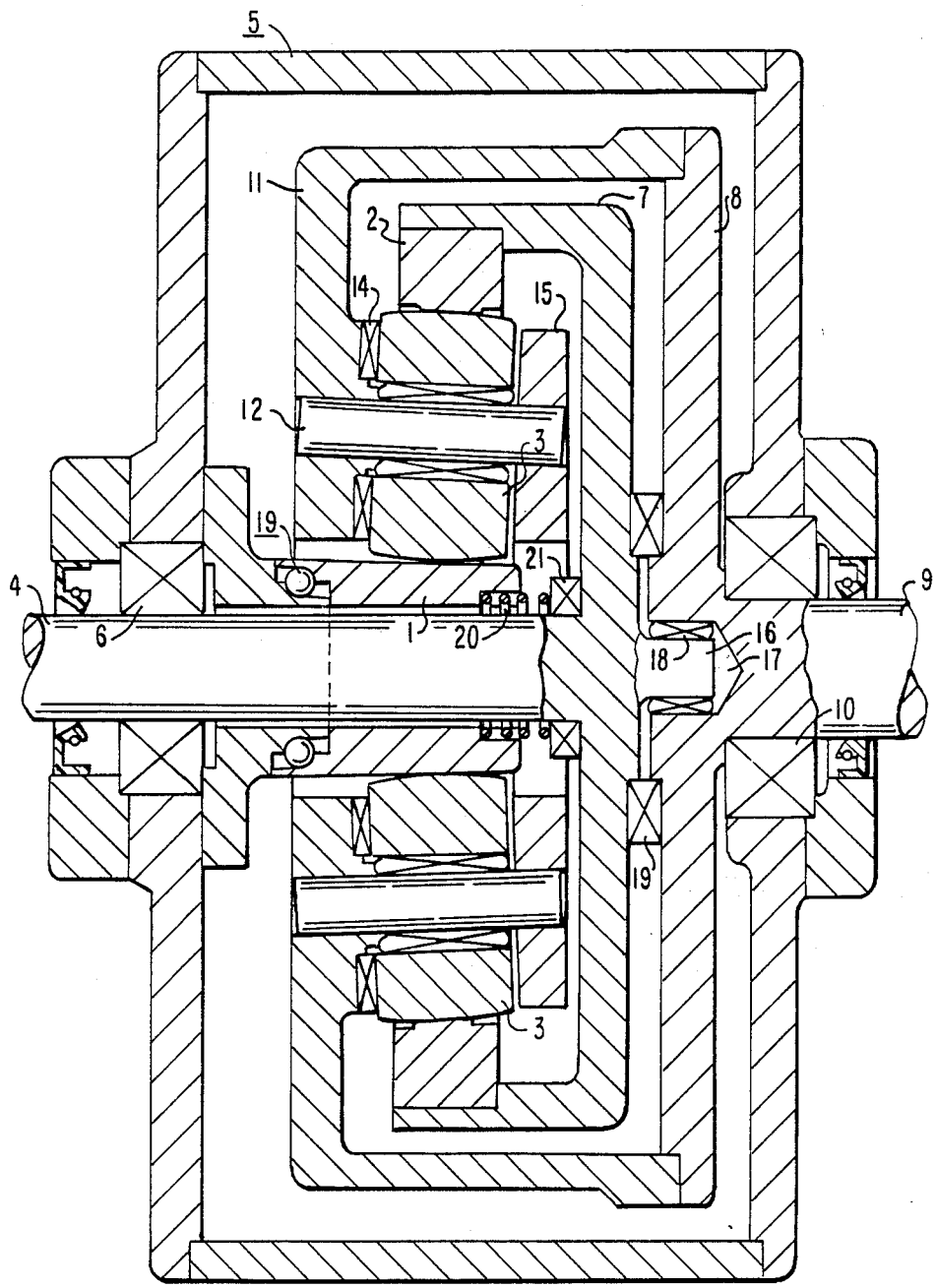
FIG. 1 is a cross-sectional view of a planetary type traction roller transmission in accordance with the invention.

As shown in FIG. 1 a planetary type traction roller transmission may include a sun structure 1 which is centrally disposed within the traction ring 2 and which, in the given arrangement, is—as far as rotation is concerned—stationary, and traction rollers 3 arranged in the annular space between the sun structure 1 and the traction ring 2. The sun structure 1 is hollow and an input shaft 4 which is rotatably supported in the housing 5 by a bearing 6 extends through the sun structure 1 and carries at its inner end an input support disc 7 supporting the traction ring 2. An output support disc 8 is associated with an output shaft 9 rotatably mounted in the housing 5 by an output shaft bearing 10 and has mounted thereon a roller carrier 11 on which the traction rollers 3 are rotatably supported by shafts 12 preferably by needle bearings 13 and axial thrust bearings 14. At the opposite side the roller shafts 12 are engaged by a support ring 15 for enhanced stability. The input support disc 7 preferably has a support trunnion extending into a central cavity 17 in the output shaft 9 and is supported therein by a bearing 18. An axial thrust bearing is disposed between the input and output support discs 7 and 8.

The sun structure 1 includes an axial camming arrangement 19 of the type disclosed in copending application Ser. No. 946,895 now U.S. Pat. No. 4,730,504 so that any torque applied to the sun 1 by the traction rollers causes the sun 1 to be moved axially away from the sun structure support and further between the traction rollers 3. To provide for better engagement of the transition rollers 3 with the sun 1 and the ring 2, the sun 1 is slightly conical. Also the traction rollers 3 are slightly conical and their axes are disposed at a slight angle larger than the cone angle of the sun. The traction race surface of the traction ring is arranged at an even larger angle, the center point of all the cones so defined coinciding on the axis of the input and output shafts.

The angle of the sun surface with regard to its axis is preferably about 1°. Assuming the traction rollers have about the same diameter as the sun, their cone surface angle would also be about 1° and the angle between the transmission axis and the axis of the traction rollers would be about 2°. The cone angle of the race surface of the traction ring would be about 3°.

The axial loading structure might be a spring if constant engagement forces are desired, that is, engagement forces which are independent of the torque transmitted through the transmission but, as mentioned before, preferably is an axial camming structure. The camming angle of the camming structure depends mainly on the cone angle selected for the sun. With accurate manufacturing techniques the cone angle may be quite small and, if desirable, there might be provided a sun return spring 20 between the sun 1 and the support disc 7 abutting the disc 7 by way of a bearing 21 to force the sun 1 back out from between the traction rollers 3 when the torque transmitted through the transmission decreases.

With the arrangement according to the invention, that is, with the slightly inclined rollers and slightly conical traction surfaces, firm engagement of all the traction rollers can be achieved with true rolling engagement of all traction surfaces, that is, without spin at any of the engaged surfaces. As a result there will be hardly any wear of the traction surfaces and the transmission will operate at superior efficiency. It is also noted that slightly conical surfaces may be manufactured just as inexpensively as cylindrical surfaces so that the manufacturing costs of such transmissions are not increased in spite of their greatly increased efficiency and durability.

Figure 2:
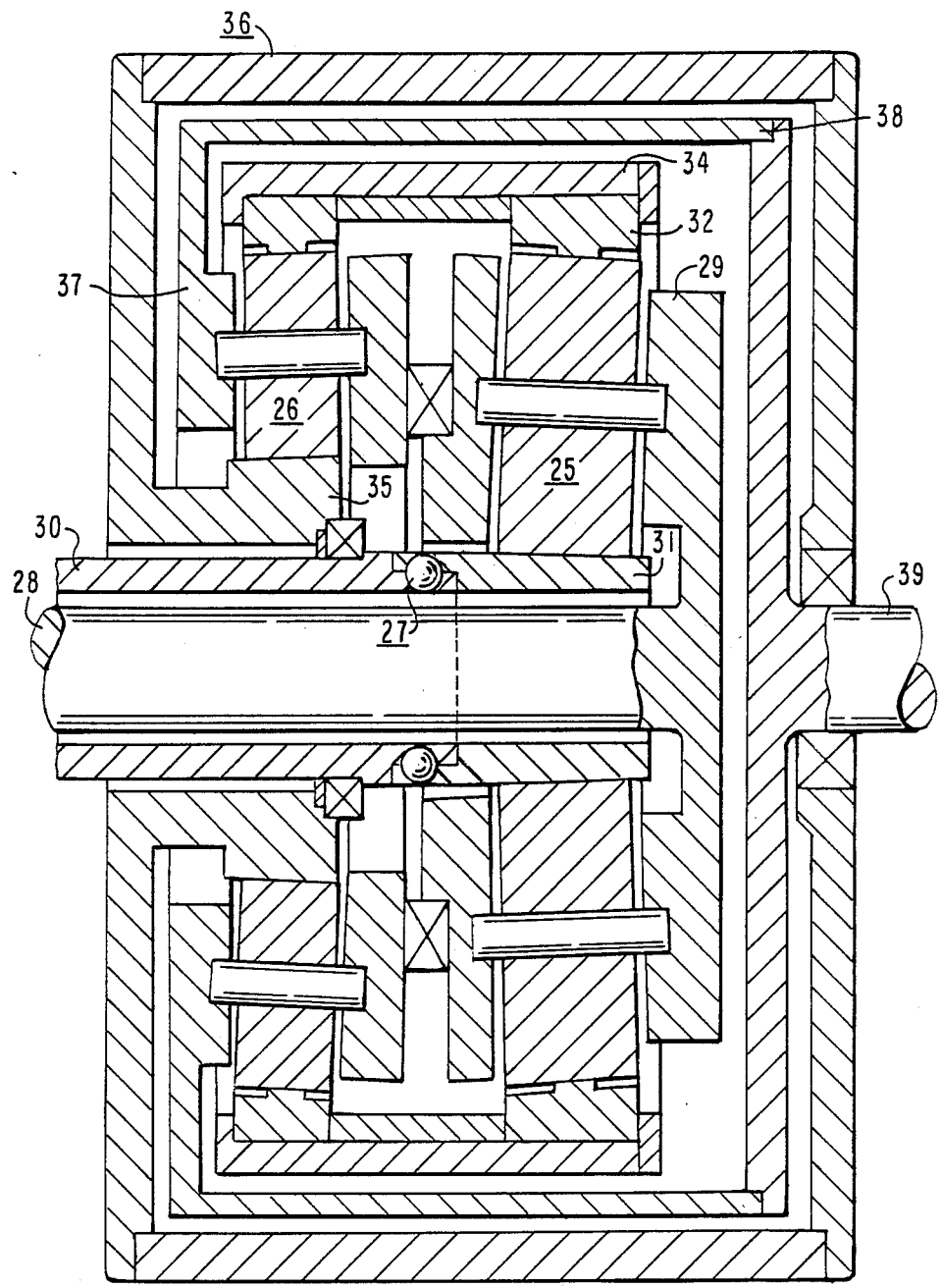
FIG. 2 shows a split torque drive arrangement with two planetary structures but only a single load cam structure serving to engage both planetary structures.

FIG. 2 shows a double-planetary structure arrangement especially for a split-torque drive, wherein two planetary drive arrangements 25 and 26 are provided in connection with only one loading cam structure 27.

There is provided a central input shaft 28 provided with a carrier 29 for the planetary traction rollers of the first planetary drive arrangement 25 and a second input shaft 30 having associated therewith the sun 31 of the first drive arrangement 25. The traction ring 32 of the first drive arrangement 25 and the traction ring 33 of the second drive arrangement 26 are supported together by a rotatable floating ring housing 34. The sun 35 of the second planetary drive arrangement is stationary and is associated with the transmission housing 36 whereas the carrier 37 of the second planetary drive arrangement 26 is connected, by means of a support bell 38, to the transmission output shaft 39. Of course, depending on the desired result, any of the shafts may be input or output shafts. For high speed-up purposes of a single output shaft one could choose shafts 28 and 39 both as input shafts rotating in opposite directions which arrangement would provide for a very high output speed of shaft 30. In any case, the torque effective at shaft 30 causes the sun 31 to move further to the right (as shown in FIG. 2) into firm engagement with the traction rollers of the first planetary drive arrangement 25 and applies an axial force to the drive arrangement 25 which is transmitted by way of the floating ring housing 34 to the second planetary drive arrangement 26 for firm engagement of its traction surfaces.

Figure 3:
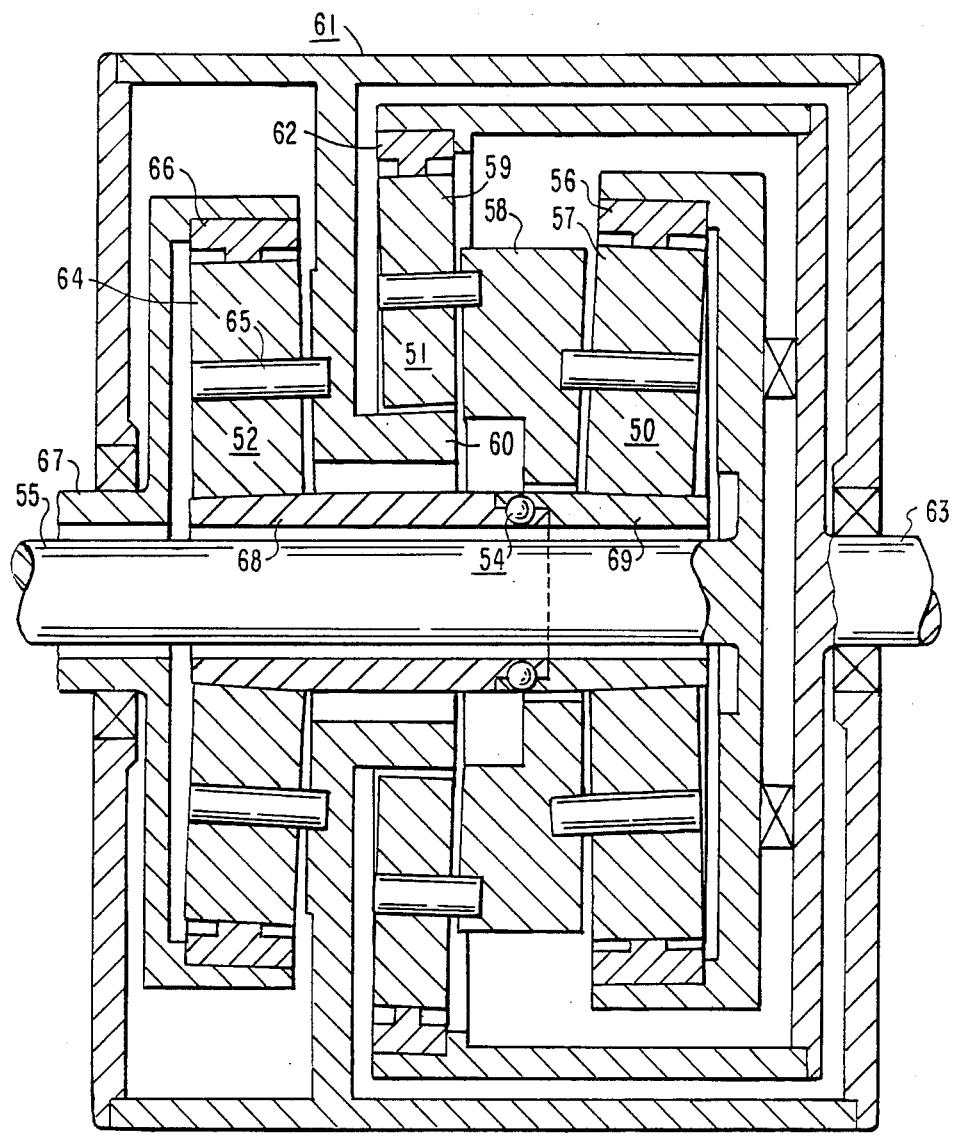
FIG. 3 shows an arrangement with three planetary drive structures using a single load cam, the third planetary structure serving to control sun speed and direction of rotation.

FIG. 3 shows a transmission with three planetary drive arrangements 50, 51, 52 all kept in engagement by a single load cam structure 54: A first input shaft 55 has operatively associated therewith the traction ring 56 of the first drive arrangement 50 whose planetary rollers 57 are mounted on a floating carrier 58 which also supports the traction rollers 59 of the second drive arrangement 51. The sun structure 60 of the second drive arrangement 51 is stationary and associated with the housing 61 whereas its traction ring 62 is connected to the output shaft 63. The third drive arrangement 52 has the planetary rollers 64 supported on stationary shafts 65 supported by the housing 61 while its traction ring 66 is connected to a second input shaft 67. The sun structure 68 of the third drive arrangement 52 extends through the sun structure 60 and, with its opposite end 69, into the first drive arrangement 50 with the opposite ends in the first and second drive arrangements being conically inclined in opposite directions and the load cam structure 54 disposed between the opposite conical sun ends 68, 69.

The third planetary drive arrangement is adapted to control sun speed and direction of rotation. However, the arrangement is shown to indicate that it is possible to provide for torque-dependent traction surface engagement of all the traction surfaces of three planetary traction roller drives by a single axial load cam structure. Load cam design and complexity is a major cost item in traction roller transmissions. The possibility of using a single cam for complex multiple drive configurations is a major breakthrough in the effort to compete with gear type transmissions.

Figure 4:
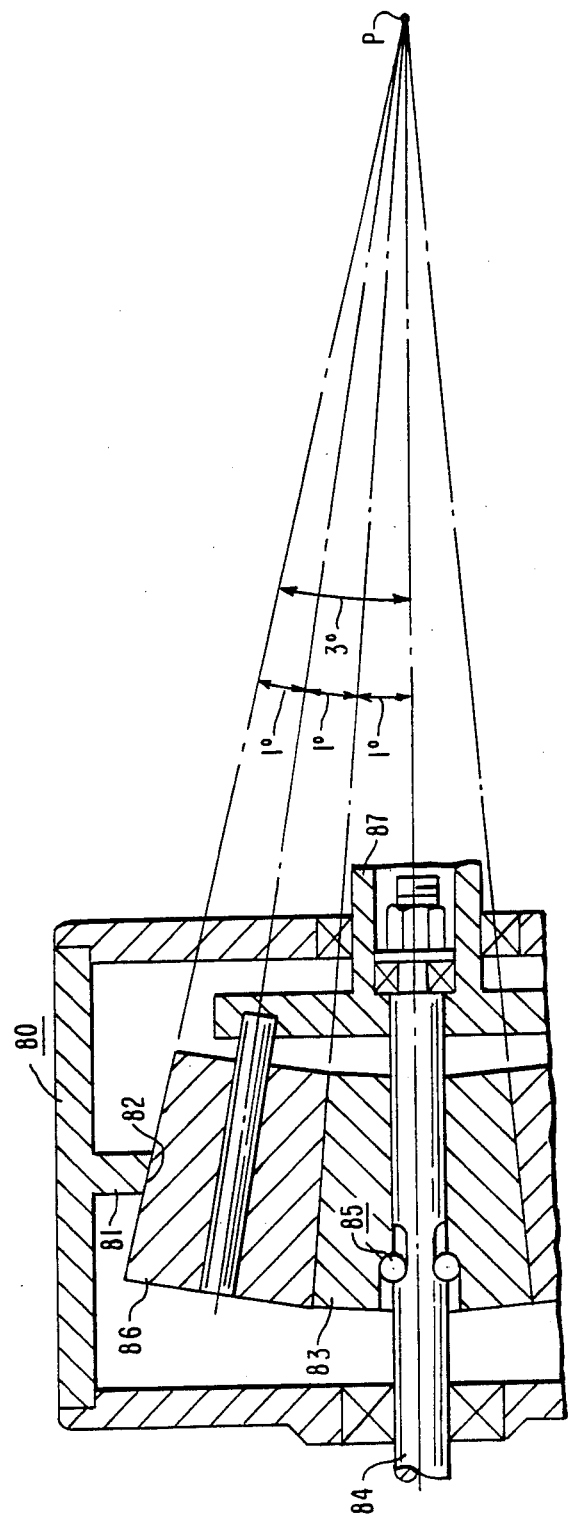
FIG. 4 is a schematic view to clearly show the major aspect of the present invention.

FIG. 4 shows schematically a most simple arrangement to clarify the concept of spin free traction roller engagement of the arrangement according to the invention. As shown the transmission housing 80 is provided with a race ring 81 having a race surface 82. The slightly conical sun roller 83 is supported on the input shaft 84 by way of the cam structure 85 and the slightly conical planetary rollers 86 are supported for orbiting with the output shaft 87 and are in engagement with the race ring 81 and the sun roller 83. The cam structure 85 is adapted to force the sun roller 83 between the planetary rollers 86 to provide traction surface engagement forces depending on the amount of torque transmitted. As shown, all axial tangents of all the traction surfaces intersect in a single point P on the transmission axis so that true rolling conditions are provided for all traction surfaces. This results in high-efficiency operation of the transmission and little wear of the traction surfaces.

The cone angle of the traction surfaces may vary within limits. Preferably, the cone angle of the sun is about 1°. The angles of the remaining traction surfaces are given with the cone angle of the sun since the axial tangents all intersect in point P. In many hundreds of hours of computer analysis a design has evolved which solves many problems associated with present planetary type traction roller transmissions. It has been determined that, depending on transmission size, the angle between the sun surface and the sun axis should be between $\frac{1}{2}$ and $1\frac{1}{2}$°. The same analysis which involved also a study of contact loading has yielded an additional unexpected result: It was found that a very slight axial curvature over the full axial length of the planetary rollers with the sun and traction ring surfaces having no axial curvature or a slight axial curvature of the sun and the traction ring with the planetary rollers having no axial curvature substantially decreases surface peak loading of all of the traction surfaces of the transmission. The reason appears to be that the surface load does not change so abruptly adjacent the axial roller ends. Slight axial curvature of the traction surfaces also reduces loads at the roller edges if the rollers, for some reason, move out of perfect alignment positions, especially if the curvature of the traction surfaces is provided on the planetary rollers. Therefore, in the preferred arrangement the sun and ring have in an axial direction straight surfaces and the traction surfaces of the planetary rollers are slightly curved.

Another substantial benefit resulting from such slight axial curvature was found to reside in the fact that in transmissions with torque-dependent loading cam structures, dangerous lowering of the traction coefficient due to light loads is prevented: Reduced load reduces the length of contact but the contact faces in the center of the roller engagement will not decrease proportionally to the load decrease.

It is noted however that the curvature provided is only slight, generally having a radius of about 12 feet. FIG. 1 shows such curvature however in greatly exaggerated form so as to make the presence of the curvature clearly visible.

It is further noted that in place of a cam structure, especially for small transmissions, a spring or, for larger transmissions, hydraulic means may be utilized as means for urging the sun member between the planetary rollers. Also mechanical such as screw-type means may be utilized.

What is claimed is:

1. A planetary type traction roller transmission comprising a sun, a traction ring concentric with, but spaced from, said sun and motion transmitting planetary type traction rollers rotatably supported in the space between said sun and said traction ring, said sun roller, said traction rollers and said traction ring all having, with respect to their axes, generally conical traction surfaces and being so disposed that the tangential axial lines of all said traction surfaces intersect in a single point on the axis of said transmission, said sun roller having a cone angle of between ½ and 1½ degrees and said planetary type traction rollers each having a traction surface with a slight axial curvature so as to provide a slight roller surface elevation in the axial center of the rollers and said sun roller having means associated therewith for axially forcing it toward said point and between said planetary rollers for forcing the planetary rollers into engagement with said sun roller and said traction ring.

2. A planetary type transmission according to claim 1, wherein said means for axially forcing said sun roller between said planetary rollers is an axial cam structure adapted to provide engagement forces which depend on the torque transmitted through the transmission.

3. A planetary type traction roller transmission according to claim 2, wherein said sun is stationary, and said transmission has an input and an output shaft, said planetary type traction rollers being supported by a carrier connected for rotation with one and said traction ring being connected for rotation with the other of said input and output shafts.

4. A traction roller transmission according to claim 1, wherein said transmission includes first and second planetary type traction roller transmission units each having a sun and a ring with planetary type rollers rotatably supported in the annular spaces between the respective sun and traction ring, said traction rings being mounted on a common carrier in firmly spaced relationship, said traction roller transmission units having traction surfaces which are oppositely inclined, said axial loading structure being arranged between said traction roller transmission units in such a manner as to force said suns in opposite directions.

5. A traction roller transmission according to claim 1, wherein the cone angle of said sun is about 1°.

6. A traction roller transmission according to claim 1, wherein said axial curvature is based on a radius of curvature of about 12 feet.

7. A planetary type traction roller transmission comprising a sun, a traction ring having a traction surface concentric with, but spaced from, said sun and motion transmitting planetary type traction rollers rotatably supported in the space between said sun and said traction ring, at least said planetary type traction rollers having traction surfaces which are slightly curved in axial direction such that the radius of axial curvature of said planetary traction rollers is about 12 feet thereby providing traction rollers with slight surface elevations in the axial centers thereof, and means for forcing said planetary traction roller in engagement with said traction ring and said sun for the transmission of motion therebetween.

* * * * *